United States Patent
Vengalathur Srinath

(10) Patent No.: US 11,049,061 B2
(45) Date of Patent: Jun. 29, 2021

(54) INTELLIGENT ADJUSTMENT OF SHIPPING DATA BASED ON PAST CUBING TENDENCIES

(71) Applicant: PAYPAL, INC., San Jose, CA (US)

(72) Inventor: Badrinath Vengalathur Srinath, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 546 days.

(21) Appl. No.: 15/612,914

(22) Filed: Jun. 2, 2017

(65) Prior Publication Data

US 2017/0351993 A1 Dec. 7, 2017

Related U.S. Application Data

(60) Provisional application No. 62/345,660, filed on Jun. 3, 2016.

(51) Int. Cl.
*G06Q 10/08* (2012.01)
*G09F 3/00* (2006.01)

(52) U.S. Cl.
CPC ............ *G06Q 10/083* (2013.01); *G09F 3/00* (2013.01)

(58) Field of Classification Search
CPC .. G06Q 10/083; G06Q 10/0835; G06Q 10/08; G06Q 10/08345; G09F 3/00
See application file for complete search history.

(56) References Cited

U.S. PATENT DOCUMENTS

| 8,612,361 | B1* | 12/2013 | Bussell | G07B 17/00435 |
| | | | | 705/335 |
| 9,747,600 | B2* | 8/2017 | Gullo | G06F 16/2358 |
| 2009/0248481 | A1* | 10/2009 | Dick | G06Q 10/06316 |
| | | | | 705/7.26 |
| 2010/0030668 | A1* | 2/2010 | Paben | G06Q 10/087 |
| | | | | 705/28 |
| 2014/0172735 | A1* | 6/2014 | Jena | G06Q 10/08345 |
| | | | | 705/330 |

(Continued)

OTHER PUBLICATIONS

Levans, M. (2009). Conveyorized cubing, weighing. Material Handling Product News, 31(5), 3. Retrieved from https://dialog.proquest.com/professional/docview/234993151?accountid=131444 (Year: 2009).*

*Primary Examiner* — Kevin H Flynn
*Assistant Examiner* — Michelle E Carey
(74) *Attorney, Agent, or Firm* — Haynes and Boone, LLP

(57) ABSTRACT

There is provided systems and methods for intelligent adjustment of shipping data based on past cubing tendencies. A user may access a service provider to request generation of shipping labels for one or more future packages to be shipped. The user may provide shipping data required to generate the labels, including a value for each label that is used to purchase shipping services using the label when the label is affixed or associated with a package. The provider may review past shipping data for the user and/or similar packages, and may determine whether the entered shipping data accurately estimates the user's shipping needs. If the past shipping data indicates that the user may require different shipping needs, such as additional value, the provider may adjust the value. Any over or under charge may then be refunded to the user on actual shipping of the package.

20 Claims, 6 Drawing Sheets

(56) References Cited

U.S. PATENT DOCUMENTS

2015/0081485 A1\* 3/2015 Angelovski ............ G06Q 40/12
                                                                      705/30
2016/0328676 A1\* 11/2016 Yeager ............... G06Q 10/0831
2017/0083864 A1\* 3/2017 Saito .................. G06Q 30/0635
2017/0220976 A1\* 8/2017 Schmidt .............. G06Q 10/083

\* cited by examiner

INTELLIGENT ADJUSTMENT OF SHIPPING DATA BASED ON PAST CUBING TENDENCIES

CROSS REFERENCE TO RELATED APPLICATION

The present application claims priority to U.S. Provisional Application, Ser. No. 62/345,660, filed Jun. 3, 2016, which is incorporated by reference in its entirety.

TECHNICAL FIELD

The present application generally relates to analysis of past shipping data for a user and determination of cubing tendencies in the past shipping data, and more specifically to adjusting presently selected shipping data through historical analysis of cubing tendencies of a user during their past shipping data.

BACKGROUND

Users (e.g., merchants/retailers, individuals, companies, government entities, and the like) may ship packages to other users that require particular shipping data (size, weight, etc.) and associated costs for using the shipping services. These users may ship multiple packages, for example, where merchants ship packages to customers. A merchant may purchase shipping labels in bulk and/or prior to determining the shipping data (e.g., each parcel's weight, size, shipping cost, etc.) for each individual package in order to save time and more efficiently ship packages. The merchant may provide a general cost for shipping of the merchant's packages, and may request one or more shipping labels be generated, where the shipping labels may later be affixed to packages and dropped off at a shipping facility. For example, "cubing" may be utilized in shipping that determines shipment volume and may be used to generally determine shipment costs per cube based on dimensions. However, such tools are inaccurate and may not correctly reflect package shipment costs. There may be problems in cubing by having small inaccuracies in the predicted shipping data for what is actually required, for example, inaccuracies in pre-purchased shipping costs and/or pre-designated sizes, weights, or other measurement. If the merchant underpays an amount required for shipping the package, the package may be returned to the merchant, thereby delaying any timely shipping of the package, or the merchant may be charged an underpayment fee. However, if the merchant overpays for shipping, the overpayment may be lost money, thereby decreasing a merchant's profits and losing money set aside for shipping costs.

Figure 1:
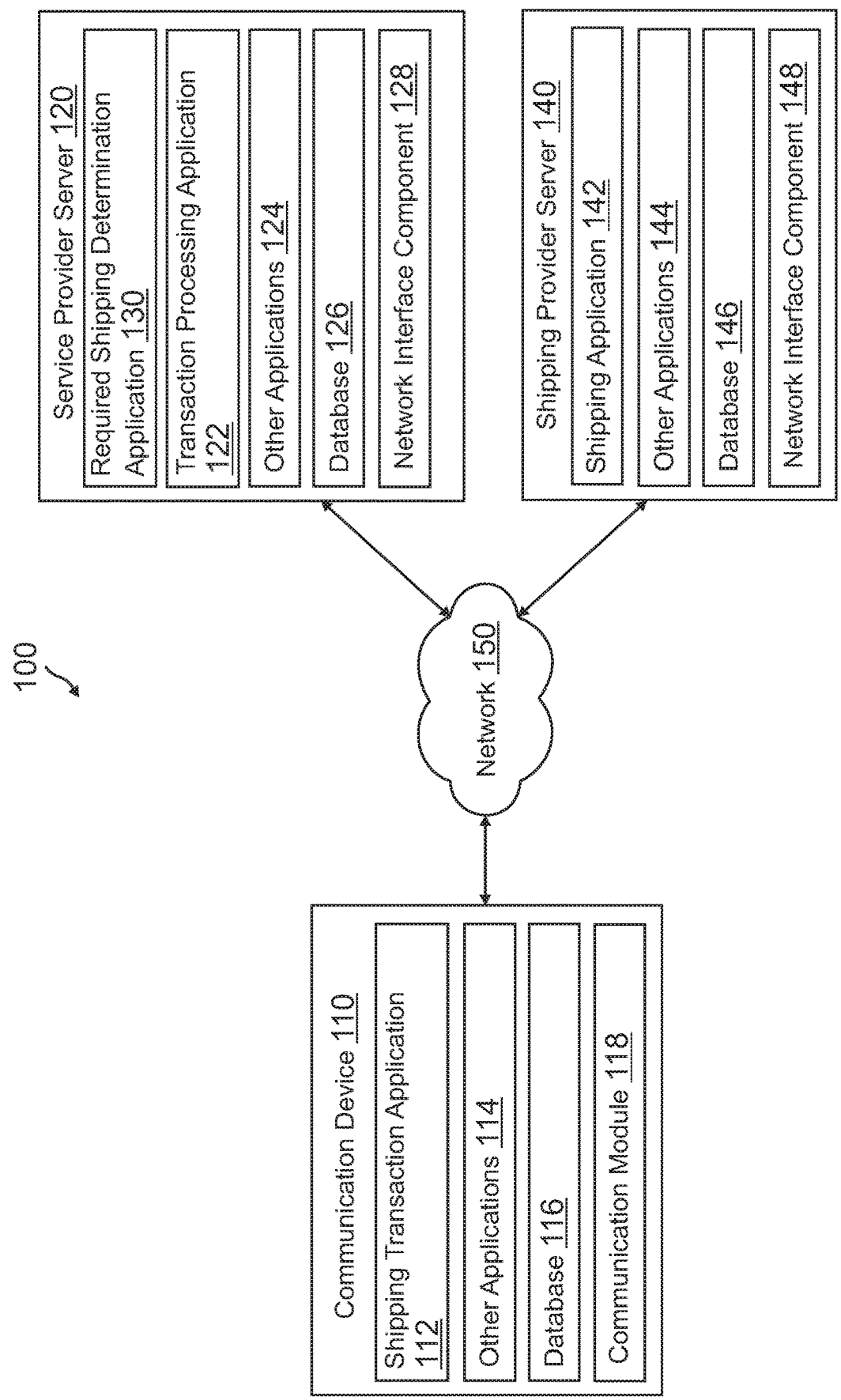
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for intelligent adjustment of shipping data based on past cubing tendencies. Systems suitable for practicing methods of the present disclosure are also provided.

A service provider may provide a payment account, including use of a digital wallet, to a user, which may include a seller, a merchant, or other entity requiring shipping services, where the payment account and/or digital wallet may include one or more funding instruments that the user may use during transaction processing. The user may utilize the payment account to purchase shipping labels that provide shipping services to the user's packages having the shipping labels affixed to them. A shipping label may correspond to a physical item that serves as evidence of payment of shipping fees and/or postage, and allows the user to utilize a shipping provider (e.g., USPS®, FEDEX®, UPS®, etc.) to ship a package utilizing various types of shipping services (e.g., air, ground, or other shipping process, as well as next day, two day, or other delivery speed or term).

Thus, the user may wish to purchase shipping labels from a shipping provider (e.g., a shipping, delivery, and/or carrier entity that provides services related to sending, receiving, and/or exchanging mail, packages, and other physical objects), which may correspond to a label allowing use of shipping services of the shipping provider. The shipping labels may be purchased having a stored amount to be used when affixed to or associated with a package and provided to the shipping provider for use of a shipping service associated with each shipping label. Thus, the shipping labels may be purchased prior to finding an exact cost for shipping of a package, and may have a general stored amount to be used for shipping of packages, which provides an advantage of convenience to the user by eliminating the need to weigh or otherwise determine an exact cost, including taking the package to the shipping provider to determine the shipping cost.

In this regard, the service provider may receive, from the user, a request to generate and/or purchase shipping labels, where the request includes a request to purchase at least one shipping label and an amount for the shipping label(s) that corresponds to a stored amount with the shipping label and to be used to provide a shipping service with a package. In other embodiments, instead of an amount, the request may include other shipping data, such as size, weight, restrictions, etc. Thus, the user may supply shipping data to generate the shipping labels, including shipping price/cost, dimensions, etc. The request may further include a type of shipping service to be utilized with use of the shipping label(s), and may indicate additional information, such as acceptable areas/countries/distances for shipping, shipping insurance, or other information related to package shipping.

The request may further include a payment instrument for payment of the label(s) by the user, which may include selection of the user's payment account to provide payment for the labels. The request may be entered to the service provider through a dedicated application of the service provider executing on a device, for example, through one or more application interfaces including selectable menu options and/or data entry field. In further embodiments, the request may be provided to the service provider through a website of the service provider offering similar website interfaces and data entry options/fields.

The service provider may connect with a shipping provider to generate the labels. In this regard, the service provider may generate the labels and alert the shipping provider of the generated labels, including label information such as a label code, scanable bar/QR code on the label, label value and/or shipping services for the label, name and address (or other contact information) for the user requesting the label, a destination for a package associated with the label, additional insurance where the insurance is covered by the shipping provider, and other necessary information. The service provider may then be required to remit payment to the shipping provider in order to provide payment for the generated shipping labels, which may occur at the time of generation of the labels or at a later time. In other embodiments, the service provider may interface with the shipping provider, for example, through accessing and communicating through an API of a label generation application of a device/server of the service provider. The service provider may then request the shipping provider to generate the shipping labels, and may be required to pay for the shipping labels at the time of generation or at a later time, for example, when account settlement is due (e.g., once a day, week, month, etc.). Additionally, although the service provider and the shipping provider are discussed as separate entities, in various embodiments, the service provider and the shipping provider may constitute a single entity or be included within a single entity.

In order to provide the services discussed herein to one or more shipping providers, the service provider may also utilize a plurality of different software and/or hardware platforms that may be utilized and/or integrated by the shipping provider. In various embodiments, the service provider may provide one or more applications that may be utilized by the service provider, where the applications may include executable processes to provide the processes described herein, including determining a predicted value for one or more shipping labels, and resolving settlement on actual shipping for differences between the predicted and actual required value. The applications may correspond to one or more applications processes in or part of a software development kit (SDK) accessible to the user, where the SDK may be utilized to generate and/or customize current applications and processes executed by the shipping provider. The shipping provider may therefore access and/or load the SDK to one or more systems, and implement application processes that provide the processes and features described herein. Moreover, the service provider may also provide in addition or in place of the SDKs, one or more remote server platforms used by the shipping provider, which may interface through API calls between APIs of applications executing on the remote server platform and one or more applications executed by the shipping provider.

As previously discussed, when generating each label, the label is generated with a certain stored value usable to pay for shipping services required for a package having the label affixed to the package. For example, the label may be generated for $1 (one dollar) worth of shipping services by the shipping provider. In other embodiments, the label may be generated for a shipping service type and/or start/destination location(s), such as 2-day shipping anywhere in the continental US. However, the user may underpay for a label if the user does not know the exact weight, dimensions, or other shipping requirements of the package having the label affixed and used for shipping. For example, the user may request that 20 labels be generated each having $1 of shipping value. The user may utilize the labels but have underpaid the amount required for the labels, such as where each package actually requires $1.10 (one dollar and ten cents) worth of paid shipping services. In this regard, the service provider may include information for historical shipping costs of the user, for example, shipping information for past shipped packages shipped by a merchant, and shipping costs required for the packages sent by the merchant. The historical shipping information may correspond to a total cost for the sent packages (e.g., each individual packages costs, as well as a per package average), as well as information about required shipping services (e.g., speed of delivery, distance of delivery, insurance, ground/air transportation, sensitive/confidential/hazardous material costs and requirements, etc.). Thus, the historical shipping information may be used to determine an average per label cost for shipping labels purchased by the user in the past.

Where the historical shipping information past or other past shipping data indicates that the user is underpaying or overpaying for shipping labels, the service provider may adjust the amount of value to be paid per label by the user in the request to purchase shipping labels by the user. In other embodiments, the past shipping data may further include information on the past sent packages of the user, including size, weight, or other dimensions, as well as shipping route, delivery time/options, etc. Thus, the service provider may determine whether a requested label is sufficient to meet the past shipping demands of the user based on another parameter or measurement instead of the shipping cost. Value per label may be adjusted automatically, or user confirmation and acceptance of the change may be required by the user. For example, after receiving the request to generate at least one label, where the request includes a per label cost and/or stored value (e.g., to be used for shipping services with the shipping provider), the service provider may adjust the per label cost/value based on the historical shipping information, increasing the per label cost/value where the user has underpaid in the past and thus incurred fees/package returns, or decreasing the per label cost/value of the user has overpaid in the past. In various embodiments, the user may not enter a per label cost for the label(s), and may instead allow the service provider to automatically determine the per label cost (and thus, per label value) based on the historical shipping information.

In various embodiments, per label cost or value may be determined using one or more predictive models that estimates or predicts a per label cost based on past data. The predictive model may determine trends in the per label cost, including increasing over time required shipping costs, decreasing over time required shipping cost, changes in package dimensions over time (e.g., size, weight, etc.), or other trend data. The predictive model may provide particular weights to certain shipping requirements, for example, for shipping insurance, additional shipping costs (e.g., hazardous or fragile material costs, overnight costs, etc.), and/or penalties for inadequate shipping including returned parcels. Once the per label cost is determined using one or more processes, the user may then purchase the shipping label(s) requested at the adjusted cost, and may receive the shipping labels having the updated per label cost based on the past/historical shipping information. In various embodiments, the per label cost may be adjusted to prevent any underpayments and thus, fees charged to the user and/or returns of shipping packages for insufficient postage/label value. Once the shipping labels are generated and/or purchased, they may be provided to the user, for example, in digital form for creation of a physical label and/or for output through a device interface when shipping the label (e.g., a scannable QR or bar code on a mobile device at a shipping location). The digital form may correspond to a digital representation of a shipping label, which may be displayed by the user on a device for scanning by another device (e.g., a bar/QR code that may be scanned when displayed on a screen of a mobile phone) or transmittable data that corresponds to a data code, such as data that may be transmitted to a scanner or terminal at a shipping location to recall the shipping label. The digital representation may also be printed into physical form using a printer, and affixed to a package. The labels may also be provided to one or more shipping locations with an identifier for the user so that the user may recall the labels at the shipping location(s).

Once the package is provided to the shipping provider and may be scanned, weighed, measured, or otherwise analyzed to determine an actual shipping cost, the shipping provider may determine an actual required shipping cost for the package. The shipping provider may determine whether the shipping label affixed to the package adequately covers the actual required shipping cost. Where the shipping label has overpaid for the package, the extra amount charged to the user for the shipping label may be returned to the service provider, and the service provider may hold the overcharge amount for the user to be utilized towards additional shipping costs. For example, if the shipping label was adjusted to have a stored value for shipping costs of $1.10, and the actual shipping cost of the package is $1.00, the $0.10 may be returned to the service provider from the shipping provider, and the service provider may hold the $0.10 for the user, which may be applied to future purchases of shipping labels, such as by reducing a cost of at least one further purchased label by $0.10. Thus, the service provider may hold the overcharge amount for use by the user in future purchases with shipping providers. In other embodiments, the amount may be returned to an account of the user (e.g., a payment account or stored to a digital wallet for redemption with other purchases).

However, if the actual required shipping cost exceeds the cost/value of the shipping label, the service provider may assist by covering any difference so that the user is not charged a fee or the package is not returned to the user. For example, if the user pays $1.10 for the shipping label based on the historical shipping information for the user, but the package, when scanned, requires $1.20 for shipping, the service provider may pay the shipping provider an additional $0.10 to adequately cover shopping. The user may then be overcharged for at least one further label purchased by the user, for example, requiring the user to pay an additional $0.10 over the cost of any further labels purchased by the user. In other embodiments, the undercharge difference paid by the service provider may be charged to a payment instrument of the user or may be withdrawn from an account of the user. If the user continually underpays and/or exceeds their allowable undercharge difference coverage by the service provider, the service provider may flag the user and take adverse account action, such as freezing the account, preventing additional purchases and/or shipments by the user using the provided labels and/or future labels, and/or alerting the user of the underpayments and underpayment amount paid by the service provider and required to be paid by the user to the service provider. In various embodiments, the user may be required to provide payment for the amount of difference payments the service provider has paid to the shipping provider before further account actions may be taken and/or shipping labels used.

The service provider may listen for these scanned or scanning events by the service provider that determines a cost for the label, for example, by listening to an Event A or further event from the shipping provider, where the Event A (or further event) corresponds to a label being scanned by the shipping provider. A scanned event may correspond to a signal and associated data, such as digital data transmittable over a network connection by one or more devices, that indicates a package has been scanned at a shipping location using a scanning device, such as a barcode/QR code scanned, RFID reader, data entry terminal, or other input device that may scan, receive, or input a identifier from a shipping label having a pre-paid value for the shipping label. As discussed above, the scanned event may further include a cost for shipping the package, and over/under payment amount of the shipping label, and/or package data or parameters used to determine a cost of shipping the package, such as a detected or entered size, weight, or required shipping services. The scanned event may be performed at the shipping location and transmitted to the service provider for processing, or may be processed by the shipping provider locally or remote from the shipping location.

In order to listen for scanned events, one or more APIs of an application providing the processes described herein may perform API requests or calls for data from one or more applications of devices that scan package labels and/or enter package data, including package dimensions or actual package cost. The API request or call may include the data for the event. In such a pull type scenario, the service provider may continuously or intermittently (e.g., at certain intervals) pull the event data from one or more devices associated with entering the actual package data when scanning the label and entering package dimensions. However, in other embodiments, the application associated with the device that enters the actual shipping data may push the data through an API call to the application providing the processes described herein, which may receive the event. In such embodiments, the device's application may be triggered to push the data based on the scanned label, for example, data encoded to the scanned label such as executable code to perform the pushing of data, a particular identifier, etc.

The previously discussed event A (or the further event) may also include the information for the correct price of the label, such as the actual package weight, dimensions, additional shipping costs (e.g., insurance, etc.), or other information that may affect the package shipping cost. Thus, the service provider may receive Event A (or the further event) and determine how much a package actually costs to ship, so that a label's correct price for the package the label is affixed to corresponds to the actual costs to ship the package. Using such information, the service provider may then determine how much the package costs to ship, and whether the merchant or user has underpaid or overpaid for the label to ship the package. The service provider may then remit payment to the shipping provider as discussed above where the amount of the shipping label is under the actual shipping cost, or account for the overpayment of the label where the amount of the label is over the shipment cost of the package. In various embodiments, the aforementioned services may be provided by the shipping provider directly when a package is provided at the shipping location. Thus, as previously discussed, a software package or other hardware or software may be provided to the shipping provided by the service provided to determine an actual cost of shipping a package for a pre-paid shipping label, and resolve over/under payment of the shipping label based on the cost. Moreover, the shipping provided may also determine a predicted shipping cost on receipt of the package prior to a shipping label being generated, for example, when a package is dropped off at a shipping location. Thus, the shipping provider may utilize the past shipping data to determine proper shipping costs on receipt of the package, which may also include use of current package information.

In the aforementioned embodiments, the shipping provider may have already been paid for the shipping labels, so that the service provider may not further adjust the cost/stored value each individual shipping labels. In further embodiments, the scan of the package and determination of the actual required shipping cost may occur prior to the service provider remitting payment to the shipping provider for the label(s) purchased by the user. In such embodiments, the service provider may then increase or decrease the value of any label, and the user may be charged for any underpayment (which may occur on a next purchase of labels), or may receive any overpayment (which may be saved for the next purchase of labels). Additionally, the service provider may utilize information on the scan of the label/package to determine an actual requiring shipping cost, which may be used to update the user's historical shipping information. Thus, a predicted shipping amount may be updated over time based on further changes in the user's shipping patterns and costs.

The historical shipping information may then be used to intelligently determine the user's per label shipping cost over time and provide accurate determinations of how much to charge for a label. Moreover, the historical shipping information may be determined across a plurality of shipping providers (e.g., FedEx®, USPS®, UPS®, Amazon® shipping services, etc.), where the per label shipping amount used by the user is determined for each shipping provider. Thus, when labels are requested for a specific shipping provider, the per label cost based on the user's historical shipping costs may be determined for the specific shipping provider. Data for historical shipping costs in a database of the service provider and/or shipping service may be updated based on the ordered shipping labels having a stored value, as well as after a scanned or scanning event where a packages actually shipping cost is determined and an over/under payment is determined. Such database updates may occur when a user orders or purchases a shipping label having a stored value, as well as after receiving data of the scanned event. The database updates may include storing data and updating a data structure having per user historical data, as well as historical data for a plurality of users, including all users and package label creations that utilize the processes described herein. For example, the database may store and update information of a particular user's purchased shipping labels, as well as variances or differences between the user's pre-purchased label value and the actual shipping cost after receiving a shipping event. The database may store and update similar data across multiple users so that not only per user historical data may be retrieved to determine a difference in purchased shipping cost, but also historical data across multiple users.

The service provider may further include additional transaction management services to process transactions for shipping labels, additional shipping costs, and/or refunds of overpaid costs, as well as account services for use with the service provider. The service provider and/or the processes and/or systems discussed may be accessible through a device application, such as a browser application, dedicated application of the service provider, and/or other application (e.g., merchant or shipping provider application) utilizing the processes and features provided by the service provider. Accounts with the service provider may correspond to a digital wallet, as well as a payment account, where a holder of the account may send and receive payments and engage in transaction processing. For example, payment accounts with a payment provider may allow the user to send and receive money for transactions, transfers, and other financial actions. The accounts of users may include personal, device, and financial information, as well as other information that may be determined by or requested from the service provider. Additionally, the user may specify authentication credentials, such as a login name, password, and/or personal identification number (PIN) for use of the account.

The processes herein may provide improvements to online electronic transactions and/or remote transactions for shipping labels through more accurate determination of predicted shipping requirements, for example, using the past data of a user. Thus, online digital shipping label generation without having a physical package for actual shipping cost calculation may be accomplished through processing past stored data and utilizing predictive models for a user's current needs. Additionally, users may be provided with automated label generation and provision of digital labels, where differences in actual shipping processes may be automatically resolved through processing event detection. Since scanned or scanning events are listened to by one or more automated application processes associated with the service provider, actual shipping requirements that are different from those provided by a purchased label may be automatically resolved with the user and/or one or more online accounts of the user. This allows users to forego additional user input to resolve these differences.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a service provider server 120, and a shipping provider server 140 in communication over a network 150. A user, such as a merchant or other entity wishing to ship a package (not shown), may utilize communication device 110 to request purchase of at least one shipping label. Thus, the user may enter a request to purchase shipping labels to communication device 110, where communication device 110 may communicate the request to service provider server 120. Service provider server 120 may utilize the request with historical shipping information to determine a predicted per label value or cost. Service provider server 120 may then utilize the request with the historical shipping information to purchase the requested label(s) from shipping provider server 140. Additionally, service provider server 120 may receive an actual shipping cost for a package having a label from the user affixed to the package from shipping provider server 140, and may provide services related to underpayment and/or overpayment of the label to the user through communication device 110 and shipping provider server 140.

Communication device 110, service provider server 120, and shipping provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with service provider server 120 and/or shipping provider server 140. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a shipping transaction application 112, other applications 114, a database 116, and a communication module 118. Shipping transaction application 112 and other applications 114 may correspond to executable processes, procedures, and/or applications with associated hardware. In other embodiments, communication device 110 may include additional or different modules having specialized hardware and/or software as required.

Shipping transaction application 112 may correspond to one or more processes to execute modules and associated devices of communication device 110 to initiate, receive, and/or process/complete transactions using services provided by service provider server 120, for example, to purchase shipping labels from shipping provider server 140. In this regard, shipping transaction application 112 may correspond to specialized hardware and/or software utilized by communication device 110 to provide an interface to permit the user associated with communication device 110 to select payment options and provide payment for items, for example, shipping labels used to ship packages, mail, and other objects to other user. In various embodiments, shipping transaction application 112 may also provide and/or receive payments and transfers to users and/or groups of users, for example, between merchants and users. Thus, in various embodiments, communication device 110 may be used by a merchant, where the merchant uses shipping transaction application 112 to receive payments from users for purchased items and purchase labels to ship the items to the users. However, in other embodiments, communication device 110 may correspond to a general user wishing to ship a package. Shipping transaction application 112 may be implemented as a user interface enabling the user to enter payment options for storage by communication device 110, select and provide payment options on checkout/payment of one or more shipping labels, and complete a transaction for the shipping label(s). In various embodiments, shipping transaction application 112 may include a general browser application configured to retrieve, present, and communicate information over the Internet (e.g., utilize resources on the World Wide Web) or a private network. For example, shipping transaction application 112 may provide a web browser, which may send and receive information over network 170, including retrieving website information, presenting the website information to the user, and/or communicating information to the website, including payment information. However, in other embodiments, shipping transaction application 112 may include a dedicated application of service provider server 120 or other entity (e.g., a shipping provider, including shipping provider server 140), which may be configured to assist in processing requests to purchase shipping labels.

Thus, shipping transaction application 112 may be utilized to select payment instrument(s) for use during a transaction between the user and service provider server 120 to purchase shipping labels. The payment instrument may be provided during a request to purchase shipping labels, which may be generated by the user through shipping transaction application 112. The request may include a number of labels to purchase, a per label cost/stored value for each label, and additional label information and/or purchased services (e.g., start/destination location, insurance, fragile/hazardous material, etc.). The request may be updated with a predicted per label cost/stored value based on historical shipping information for the user by service provider server 120, as discussed herein. The user may allow the predicted/estimated per label cost/stored value to automatically be updated for the requested label(s), or may be required to authorize the change in the per label cost/stored value through shipping transaction application 112. Shipping transaction application 112 may utilize user financial information, such as a credit card, bank account, or other financial account, as a payment instrument when providing payment information for use in the purchase of the label(s). In other embodiments, shipping transaction application 112 may provide a token that identifies the user, a digital wallet, and/or a payment instrument to service provider server 120 for use in transaction processing. Additionally, shipping transaction application 112 may utilize a user account with a payment provider, such as service provider server 120, as the payment instrument. The user may therefore generate a payment request to service provider server 120 for one or more labels. Shipping transaction application 112 may be utilized to view the results of the transaction and/or for viewing and storage of a transaction history, such as a receipt. Additionally, shipping transaction application 112 may be used to view and/or print the shipping label(s) where the labels are not physically sent to the user. Moreover, where overpayment or underpayment of one or more shipping labels occurs, shipping transaction application 112 may be used to view the over/underpayment, as well as account alerts and further actions taken as a result of the over/underpayment, which may include payments directed to further label purchases.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include additional communication applications where not provided by shipping transaction application 112, such as email, texting, voice, and IM applications that allow a user to send and receive emails, calls, texts, and other notifications through network 150. In various embodiments, other applications 114 may include financial applications, such as banking, online payments, money transfer, or other applications, which may be utilized to request payments made through a telecommunication account associated with shipping transaction application 112 and/or communication device 110. Other applications 114 may also include other location detection applications, such as a mapping, compass, and/or GPS application, which may be used to determine a location for the user. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, IDs such as operating system registry entries, cookies associated with shipping transaction application 112 and/or other applications 114, IDs associated with hardware of communication device 110, or other appropriate IDs, such as IDs used for payment/user/device authentication or identification. Database 116 may store information for an account for shipping transaction application 112 and/or communication device 110, such as identifiers, tokens, and/or authentication. Additionally, transaction information for a transaction by the user for communication device 110 (e.g., to purchase shipping labels) may be stored to database 116, including a selected payment instrument, such as the telecommunication account. Database 116 may include information for a digital wallet, such as available payment instruments in the digital wallet. Additionally, database 116 may store any purchased shipping labels, as well as information associated with the purchased shipping labels.

Communication device 110 includes at least one communication module 118 adapted to communicate with service provider server 120 and/or shipping provider server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by a risk analysis and fraud service provider, which may include payment processing providers and other type of financial service providers. In this regard, service provider server 120 includes one or more processing applications which may be configured to interact with communication device 110 and/or shipping provider server 140, and/or another device/server to facilitate risk and fraud analysis for financial transactions, as well as digital wallet use and transaction processing. In one example, service provider server 120 may be provided by PAYPAL®, Inc. of San Jose, Calif., USA. However, in other embodiments, service provider server 120 may be maintained by or include another risk analysis entity and/or financial entity.

Service provider server 120 of FIG. 1 includes required shipping determination application 130, a transaction processing application 122, other applications 124, a database 126, and a network interface component 128. Required shipping determination application 130, transaction processing application 122, and other applications 124 may correspond to executable processes, procedures, and/or applications with associated hardware. In other embodiments, service provider server 120 may include additional or different modules having specialized hardware and/or software as required.

Required shipping determination application 130 may correspond to one or more processes to execute modules and associated specialized hardware of service provider server 120 to receive a request to purchase shipping labels for a price or stored value for each shipping labels from a user, determine an estimated required cost or stored value for each shipping label based on historical shipping information for the user, and purchase labels for the user. In this regard, required shipping determination application 130 may correspond to specialized hardware and/or software to first receive a request to purchase shipping labels from a user, such as the user associated with communication device 110. Thus, the user may communicate the request to required shipping determination application 130 from communication device 110, as discussed herein. The request may include at least a number of labels to purchase, and an amount the user may wish to have each label purchased for, such as a value of each label for shipping services rendered by the entity associated with shipping provider server 140. Required shipping determination application 130 may then access past shipping data in general and/or particular past/historical shipping information for the user, which may include information about previous shipped packages by the user, as well as a cost to ship each of those packages (e.g., a cost paid for a label allowing shipment of each of the packages). For example, a merchant may request a label for a specific product (e.g., iPhone 6) or a specific type of product (e.g., a smart phone), along with a destination zip code or other destination information. Based on past shipments to that location for that particular product or type of product, the service provider can determine an estimated shipping cost.

Using the historical shipping information, required shipping determination application 130 may determine a per label cost for packages shipped by the user, for example, if the user generally ships packages costing an average of $1.00 to ship. Required shipping determination application 130 may favor or weigh more recent information higher in the determination, and may limit the analysis to only information over a certain period of time. Additionally, required shipping determination application 130 may also provide a buffer amount over the per label average to ensure that the label adequately pays for shipping costs. Such information may also be determined at a previous time, and may be updated based on newly incoming information on additional packages shipped by the user. Thus, the per label cost based on past shipped packages may be continually updated to reflect a most recent per label cost.

Once per label cost is determined, the request may be updated, and the per label cost may be used to purchase the labels. In various embodiments, the user may be required to authorize the change to the per label cost in the request. Required shipping determination application 130 may then effectuate a purchase of the labels, for example, by either generating the labels and providing the labels to communication device 110, or by purchasing the labels through shipping provider server 140 and communicating the labels to communication device 110. Where required shipping determination application 130 generates the labels, required shipping determination application 130 may provide payment to shipping provider server 140. The payment may be provided at the time of generation of the labels, or at a later time, for example, for account settlement of generated labels by service provider server 120. Additionally, required shipping determination application 130 may be used to provide any additional payments to shipping provider server 140 where a label underpays for shipping services, or receive a notification that a shipping label overpays for shipping services and adjust future purchases or hold the overpayment amount for the user for future purchases. Thus, required shipping determination application 130 may utilize transaction processing application 122 to purchase labels with shipping provider server 140.

Transaction processing application 122 may correspond to one or more processes to execute modules and associated specialized hardware of service provider server 120 to receive and/or transmit information from communication device 110 for establishing payment accounts, as well as processing and completing of one or more transactions initiated using the payment accounts to purchase shipping labels. In this regard, transaction processing application 122 may correspond to specialized hardware and/or software to establish payment accounts and associated digital wallets, which may be utilized to send and receive payments and monetary transfers and engage in other financial transactions. The user associated with communication device 110 may establish a payment account with transaction processing application 122 by providing personal and/or financial information to service provider server 120 and selecting an account login, password, and other security information. In various embodiments, the financial information may include payment instruments. The payment account may be used to send and receive payments, including payments to purchase shipping labels from shipping provider server 140. The payment account may be accessed and/or used through a browser application and/or dedicated payment application executed by communication device 110. Transaction processing application 122 may receive a payment request from communication device 110 for a transaction between the user and the shipping entity associated with shipping server 140 to purchase shipping labels, which may include identifiers, tokens, or other data used for transaction processing. Transaction processing application 122 may provide payment to the shipping entity using the payment account, which may include payment for an estimated per label cost determined using required shipping determination application 130. Thus, the telecommunication account may be used as a payment instrument further by service provider server 120 for transaction processing.

In various embodiments, service provider server 120 includes other applications 124 as may be desired in particular embodiments to provide features to service provider server. For example, other applications 124 may include security applications for implementing server-side security features, programmatic client applications for interfacing with appropriate application programming interfaces (APIs) over network 150, or other types of applications. Other applications 124 may contain software programs, executable by a processor, including a graphical user interface (GUI), configured to provide an interface to the user when accessing service provider server 120. In various embodiments where not provided by required shipping determination application 130 and/or transaction processing application 122, other applications 124 may include connection and/or communication applications with one or more external devices, for example, to generate shipping labels using past data and/or process transactions.

Additionally, service provider server 120 includes database 126. As previously discussed, one or more users may establish a payment account including a digital wallet with service provider server 120. Accounts in database 126 may include entity information, such as name, address, birthdate, payment/funding information, additional user financial information, and/or other desired user data. An entity may link to their respective accounts through an account, user, merchant, and/or device ID, as well as a generated token, which may be provided to communication device 110 for use. Thus, when an ID is transmitted to service provider server 120, e.g., from communication device 110, an account belonging to the entity may be found. Additionally, historical shipping information for past shipped packages by users may be stored to database 126, as well as information determined using the historical shipping infotmation, such as an estimated per label cost for labels purchased by a user based on past shipped packages.

In various embodiments, service provider server 120 includes at least one network interface component 128 adapted to communicate communication device 110 and/or shipping provider server 140 over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Shipping provider server 140 may be maintained, for example, by a service provider that offers resources, infrastructure, devices, and/or other technology to ship one or more packages between users, including from merchants to users. In this regard, shipping provider server 140 may correspond to a standalone shipping service, or may correspond to merchants having associated shipping services. Shipping provider server 140 includes one or more processing applications which may be configured to interact with communication device 110, and/or service provider server 120 to engage in a sale of shipping service, for example, through purchase of prepaid shipping labels having stored value usable to the shipping services. Although a server is shown, the server may be managed or controlled by any suitable processing device. Although only a single service provider is shown, a plurality of service providers may function similarly.

Shipping provider server 140 of FIG. 1 contains a shipping application 142, other applications 144, a database 146, and a network interface component 148. Shipping application 142 and other applications 144 may correspond to processes, procedures, and/or applications executable by a hardware processor, for example, a software program. In other embodiments, shipping provider server 140 may include additional or different modules having specialized hardware and/or software as required.

Shipping application 142 may correspond to one or more processes to execute modules and associated specialized hardware of shipping provider server 140 that provide sales, checkout, and payment processes for purchase of shipping labels, as well as scanning or receipt of scanned data or a package shipped using one of the shipping labels for determination of an actual shipping cost and effecting shipping of the package. In this regard, shipping application 142 may correspond to specialized hardware and/or software of shipping provider server 140 to provide a convenient interface to permit a seller to enter, view, and/or edit items and/or services for purchase by the user associated with communication device 110, such as shipping labels and associated services. For example, shipping application 142 may be implemented as an application having a user interface enabling the seller of shipping labels (e.g., a salesperson for shipping label server 140) to enter label information and request payment for a transaction for the shipping labels. In certain embodiments, shipping application 142 may correspond more generally to an application hosting a website configured to provide sales of items over the Internet. Shipping application 142 may provide item sales through an online marketplace using the website of shipping provider server 140. Thus, shipping application 142 may receive a request to purchase shipping labels and associated shipping services, and may cause the labels to be generated based on the requested per label stored value and associated shipping services.

Where the labels are already generated by service provider server 120, shipping application 142 may receive the generated labels and activate the labels so that the labels may be utilized to ship packages (e.g., by storing the label information, such as a code, barcode, QR code, user information, shipping information, etc., for use when the label is received and a package is to be shipped using the label). Once a payment amount is determined for a transaction for the labels, shipping application 142 may request payment from service provider server 120 for transaction processing. Payment may be provided through a payment instrument, such as a telecommunication account for the user, which may be associated with shipping transaction application 112 and/or communication device 110. Shipping provider server 140 may process the transaction with the provided payment instrument and determine whether to approve or decline the transaction. Shipping application 142 may then receive the results of the transaction processing, and complete the transaction with the user, for example, by providing the shipping labels to communication device 110 and/or service provider server 120, or by allowing the label to be used for shipping. Shipping application 142 may receive data from a scan of a generated shipping label, which may include information used to determine an actual shipping cost for the package associated with the scanned shipping label.

Where underpayment of the shipping label has occurred, shipping application 142 may request additional payment from service provider server 120, which may be paid immediately or may be charged to a payment by service provider server 120 to shipping provider server 140 (e.g., which may occur in a transaction for the that shipping label, as well as other shipping labels, if the shipping label has not yet been paid for by service provider server 120 or may occur in a transaction for future shipping labels). However, where overpayment has occurred, shipping application 142 may provide reimbursement of the amount to service provider server 120, may reduce the cost of the a transaction for the shipping label if the shipping label has yet to be paid for by service provider server 120, or may allow for reduction in a further transaction for shipping labels by service provider server 120.

In various embodiments, shipping provider server 140 includes other applications 144 as may be desired in particular embodiments to provide features to shipping provider server 140. For example, other applications 124 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to the user when accessing shipping provider server 140, where the user or other users may interact with the GUI to more easily view and communicate information. In various embodiments, other applications 144 may include connection and/or communication applications, which may be utilized to communicate information over network 150.

Shipping provider server 140 may further include database 146 which may include, for example, identifiers such as operating system registry entries, cookies associated with shipping application 142 and/or other applications 144, identifiers associated with hardware of shipping provider server 140, or other appropriate identifiers, such as identifiers used for payment/user/device authentication or identification. Database 146 may further include telecommunication accounts for data transfers and payments.

Shipping provider server 140 includes at least one network interface component 148 adapted to communicate with communication device 110 and/or service provider server 120. In various embodiments, network interface component 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
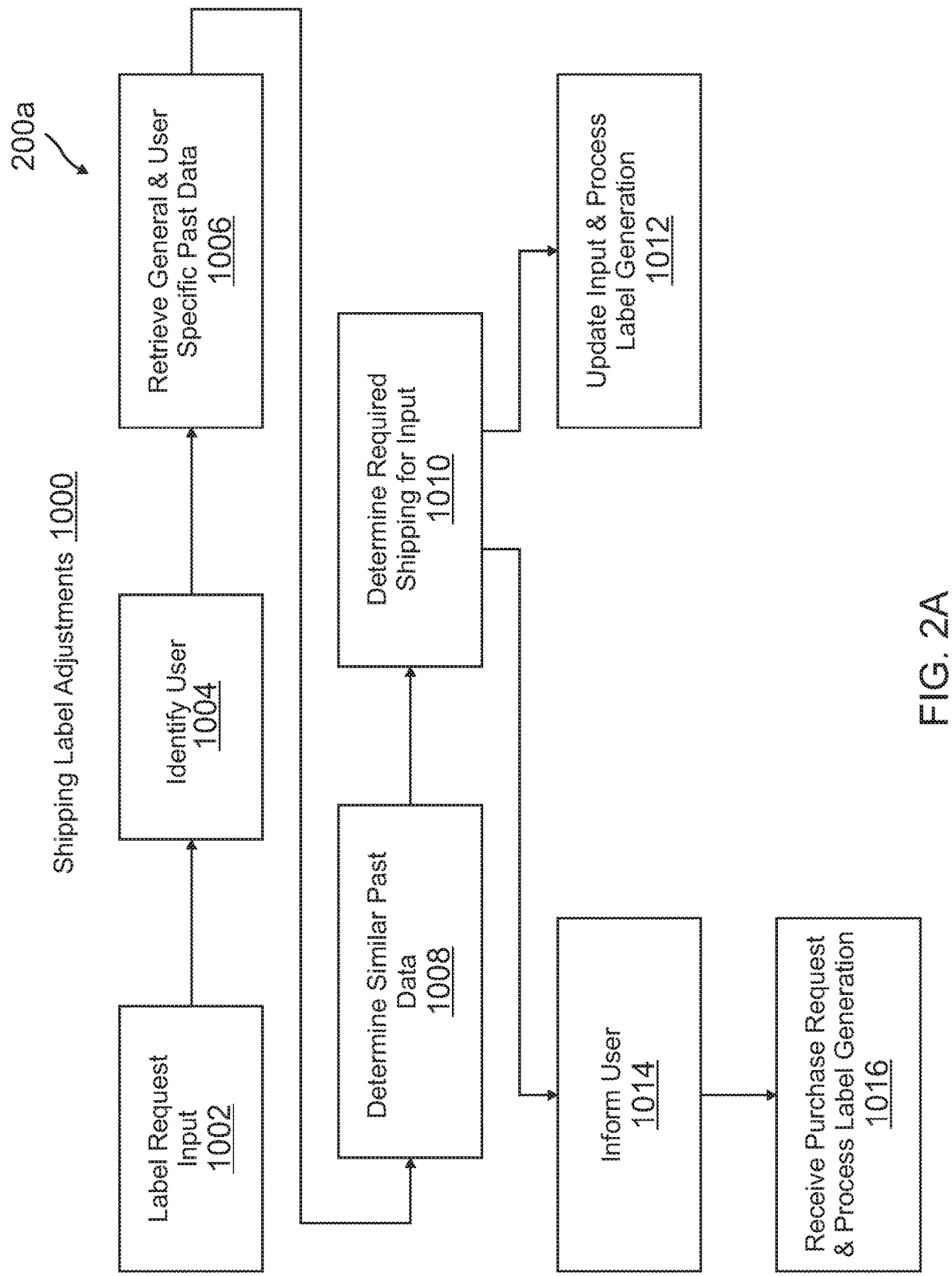
FIG. 2A is an exemplary flowchart to provide shipping label adjustments based on historical shipping data and cubing tendencies of one or more users, according to an embodiment.

FIG. 2A is an exemplary flowchart 200a to provide shipping label adjustments based on historical shipping data and cubing tendencies of one or more users, according to an embodiment. The flowchart 200a may be executed by one or more processing entities described herein, including service provider server 120 and/or shipping provider server 130. The steps of flowchart 200a may be executed by one or more application processes, for example, through API requests between additional applications to receive input data and/or output data for processing.

Shipping label adjustments 1000 may begin by receiving a label request input at step 1002, which may correspond to shipping data selected by a user for a package requiring a shipping label that provides shipping services for a value of the label. The shipping data may be assumed or generalized by the user, for example, based on the user's needs, and may not correspond to exact requirements (e.g., costs, parcel route, etc.) and/or dimensions of a package. However, in other embodiments, the package data may be input from measured or determined quantities by the user. At step 1004, the user is identified in order to determine potential or predicted shipping requirements for one or more shipping labels, including the requested shipping label, based on the user's past shipping needs and/or shipping transactions. Thus, at step 1006, general and user specific past shipping data is retrieved. The general past shipping data may include packages sent by other users, including packages similar to the one being sent by user, and differences between those packages pre-purchased and/or predicted shipping value and the packages actual required predicted value. Additional general shipping data may include current shipping prices, increases in prices, and/or other shipping values or adjustments. The user specific data may include the user's past shipped packages and their required shipping values purchased for shipping, as well as differences between pre-purchased and/or predicted shipping value and actual required shipping value.

Using the data, at step 1008, similar past shipping data may be determined, for example, through analysis of trending data in user purchases for shipping label values, as well as over/under payment for required shipping label cost/value. The similar past shipping data may also include package measurements and/or dimensions used to determine common or similar items the user ships, and the required shipping value to be purchased for a label for the past similar items. Thus, a determination of the difference between the shipping data input by the user, such as a requested value for a shipping label input at step 1002, and the past data may be determined. Using the past required shipping value and/or the difference between the requested and past required shipping values, at step 1010, required shipping for the requested label input at step 1002 may be determined.

In various embodiments, shipping label adjustments 1000 may automatically proceed with updating the input for the requested label and processing a label generation at step 1012. In such embodiments, the shipping label may be automatically generated to account for the past required shipping label values and/or the difference between the requested and past required shipping values. However, in other embodiments, the user may be informed of the past required shipping value for shipping labels purchased for common or similar items shipped by the user at step 1014, as well as the difference between the requested value for the requested label, and the past required shipping values. In such embodiments, a purchase request may be received, which may be for the requested value or amount at step 1002 and/or the provided past required shipping amount/value at step 1014, and the purchase request may be processed to generate a label.

Figure 2B:
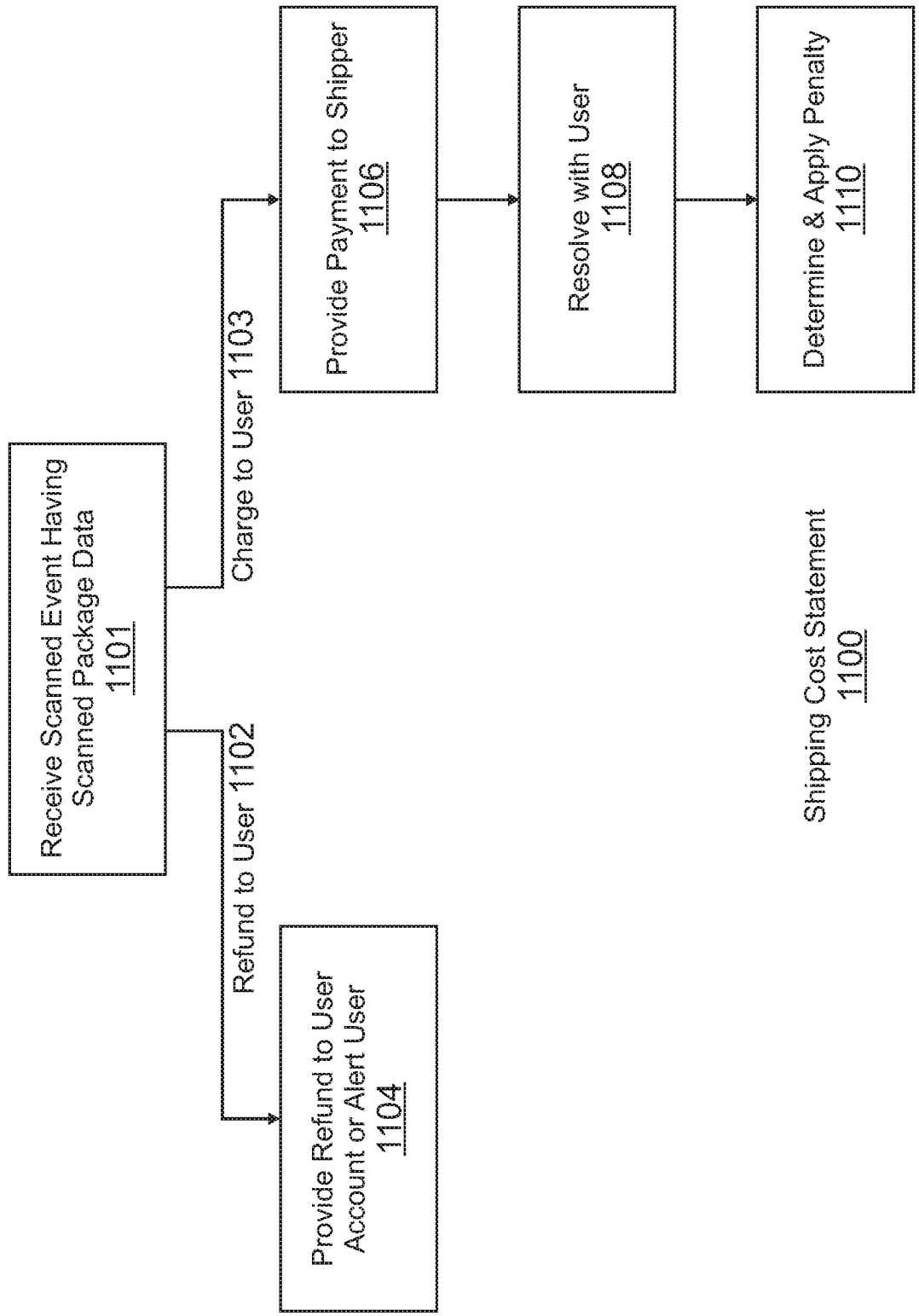
FIG. 2B is an exemplary flowchart to settle shipping label differences of a pre-purchased shipping label after determination of actual shipping requirements for a user, according to an embodiment.

FIG. 2B is an exemplary flowchart to settle shipping label differences of a pre-purchased shipping label after determination of actual shipping requirements for a user, according to an embodiment. The flowchart 200*b* may be executed by one or more processing entities described herein, including service provider server 120 and/or shipping provider server 130. The steps of flowchart 200*b* may be executed by one or more application processes, for example, through API requests between additional applications to receive input data and/or output data for processing.

In order to determine whether a pre-purchased shipping label having a predicted or input shipping value or amount is sufficient for required actual shipping costs, or whether there is an over/under payment for the pre-purchase shipping label, one or more processes may listen for scanned events of packages over a network with one or more devices associated with scanning the pre-purchased shipping label and performing actual shipping of the package associated with the label. Shipping cost settlement 1100 may therefore receive a scanned event having scanned package data, at step 1101. The scanned package data may include information identifying the label affixed to the package, such as a scanned identifier for the label, as well as the label's value. The scanned data may also include an actual shipping cost, or data necessary to determine an actual shipping cost, such as package dimensions, parameters, or measurements.

Based on differences between the actual shipping cost and the shipping value or amount in the pre-purchased shipping label, shipping cost settlement 1100 may proceed in two different paths, a refund to a user in path 1102 or a charge to the user in path 1103. If there is a refund to the user in path 1102, step 1104 may include providing a refund or reimbursement for the difference in the pre-purchased shipping label amount and the actual shipping cost to an account for the user and/or alerting the user of the available refund. In other embodiments having a charge to the use in path 1103, a service provider may provide a payment to the shipper at step 1106, for example, automatically without requiring a user payment and/or account for debiting the amount. At step 1108, the underpayment may be resolved with the user, for example, by requiring the user provide funds for the payment made by the service provider to the shipper at step 1106. This may include automatically deducting from an account and/or alerting the user of the required payment and providing an electronic transaction for processing with the user. Certain embodiments may further require that a penalty is determined and applied to the user at step 1110, which may be applied in the case of non-payment for the amount of the underpayment and/or for repeated underpayment of pre-purchased shipping labels by the user.

Figure 3:
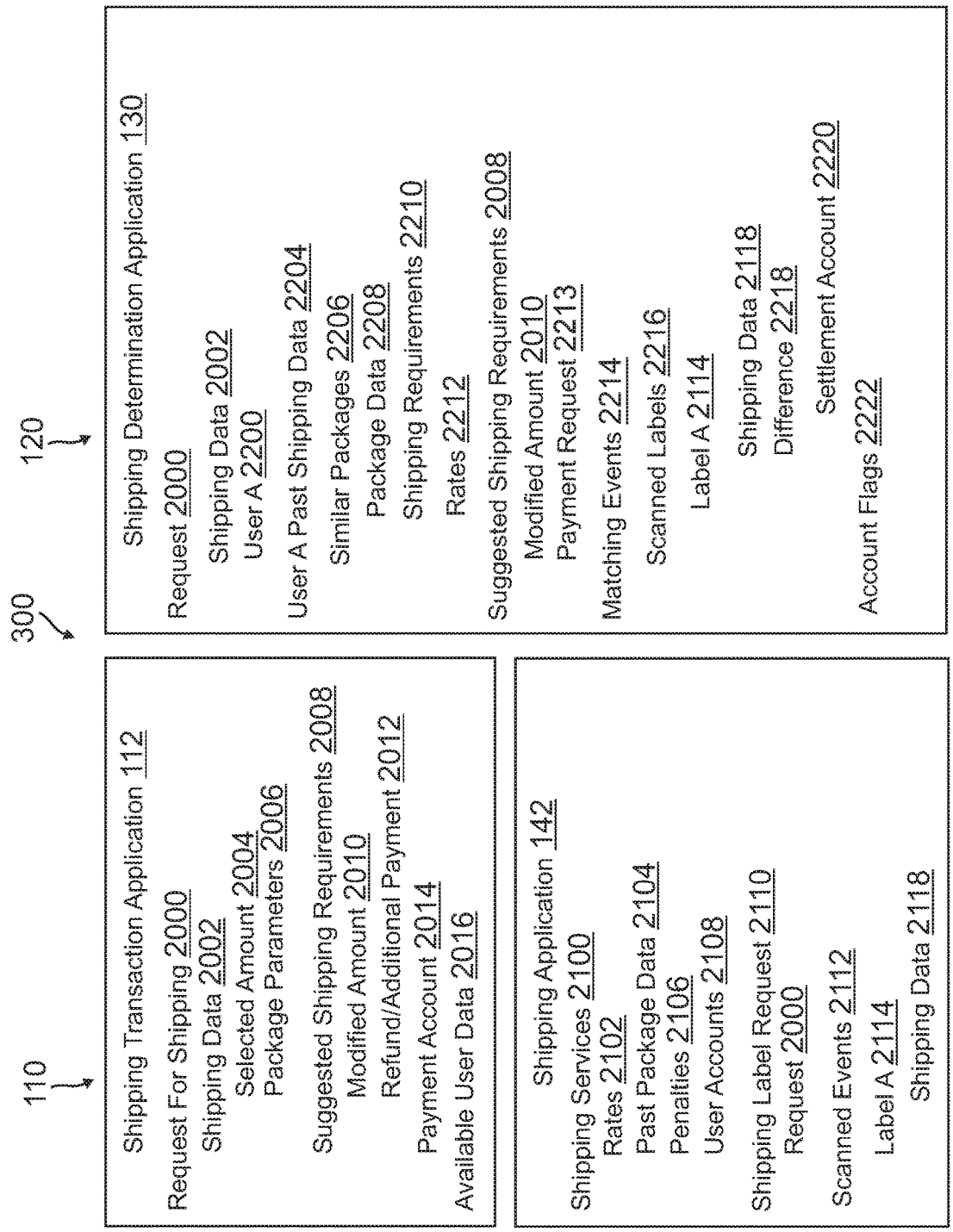
FIG. 3 is an exemplary data processing environment having a communication device, a service provider server, and a shipping provider server in communication for intelligent adjustment of shipping data based on past cubing tendencies, according to an embodiment.

FIG. 3 is an exemplary data processing environment 300 having a communication device, a service provider server, and a shipping provider server in communication for intelligent adjustment of shipping data based on past cubing tendencies, according to an embodiment. Environment 300 of FIG. 3 includes communication device 110, service provider server 120, and shipping provider server 140 as discussed in reference to environment 100 of FIG. 1.

Communication device 110 includes shipping transaction application 112 corresponding generally to the processes and features discussed in reference to shipping transaction application 112 in environment 100 of FIG. 1. In this regard, shipping transaction application 112 includes input and received data used to generate one or more shipping labels, which may have a corresponding value or amount purchased and stored for use in shipping a package or other item. Shipping transaction application 112 includes a request for shipping 2000 input by a user, which may have shipping data 2002 input by the user, such as a selected amount 2004 and/or package parameter 2006 that the user is using to request generation of a shipping label. Based on data processed by service provider server 130, request for shipping 2000 may be updates with data for suggested shipping requirements 2008, which may include a modified amount 2010 for selected amount 2004 to compensate for changes or differences in past required shipping costs to ship the user's packages and/or same or similar packages. Suggested shipping requirements 2008 may also include a refund/additional payment 2012 required for the modified amount 2010, or that will be provided if purchasing the shipping label for selected amount 2004. Request for shipping 2000 may further include a payment account 2014 used to resolve purchase and/or over/under payments for request for shipping 2000. Moreover, shipping transaction application 112 may include available user data 2016 that may include past shipping data for the user, or identifiers used to determine the past shipping data.

Shipping provider server 140 includes shipping application 142 corresponding generally to the processes and features discussed in reference to shipping application 142 in environment 100 of FIG. 1. In this regard, shipping application 142 includes data available to generate a shipping label, as well as one or more processes to generate the shipping label and provide to a user. Shipping application 142 includes shipping services 2100, which may include rates 2212 for shipping one or more packages, past package data 2104 for packages shipped by one or more users, penalties 2106 for insufficient package label value, and/or user accounts 2108 for users that ship items and use shipping services 2100. Shipping application may receive a shipping label request 2110, such as request 2000 for generation of a shipping label. Additionally, shipping application 142 may receive one or more scanned events 2112 for transmission to shipping determination application 130, including a scan of label A 2114 having shipping data 2118.

Service provider server 160 includes shipping determination application 130 corresponding generally to the processes and features discussed in reference to shipping determination application 130 in environment 100 of FIG. 1. In this regard, shipping determination application 130 includes data and processes necessary to determine a predicted value for a pre-purchased shipping label based on past shipping data. Shipping determination application 130 may therefore receive request 2000 from communication device 110, which may include shipping data 2002 and an identifier for user A 2200. Shipping determination application 130 may then access user A past shipping data 2204, including similar packages 2206 to shipping data 2002. Similar packages 2206 may include package data 2208 for past shipped packages, such as cost to ship, measurements, etc., as well as past shipping requirements 2210 (e.g., costs, weights, freight type, etc.), and rates 2212 for past and current shipping.

Using the aforementioned data, shipping determination application 130 may determine suggested shipping requirements 2008 transmitted to shipping transaction application 112 and/or used to automatically purchase shipping labels for a stored or pre-set value, for example, using the modified amount 2010. Shipping determination application 130 may do so using payment request 2213. After purchase of the labels, shipping determination application 130 may listen for matching events 2214 during a scan or entry of a label identifier, such as scanned labels 2216. Matching events 2214 may correspond to data for a scanning event that matches stored data for a shipping label purchased with a pre-stored value. For example, matching events 2214 may include data for an actual shipping cost of a package that is deter pined when a label for the package is scanned and the package is shipping. Such data may be used to update a database by linking the data through a data structure to the stored data for a shipping label and the cost or value of the label purchased at the time of creation of the label. The aforementioned data may be used to determined historical shipping data and past shipping costs for a user. Thus, scanned labels 2216 may include label A 2214. Label A 2214 may be associated with shipping data 2118 for the actual shipping cost and/or requirements of a package, where difference 2218 (e.g., an over or under payment) may be determined, and a settlement account 2220 used to refund or pay the over or under payment, respectively. Additionally, account flags 2222 may be used to determine whether any account is acting fraudulently and/or abusing the predictive label generation.

Figure 4:
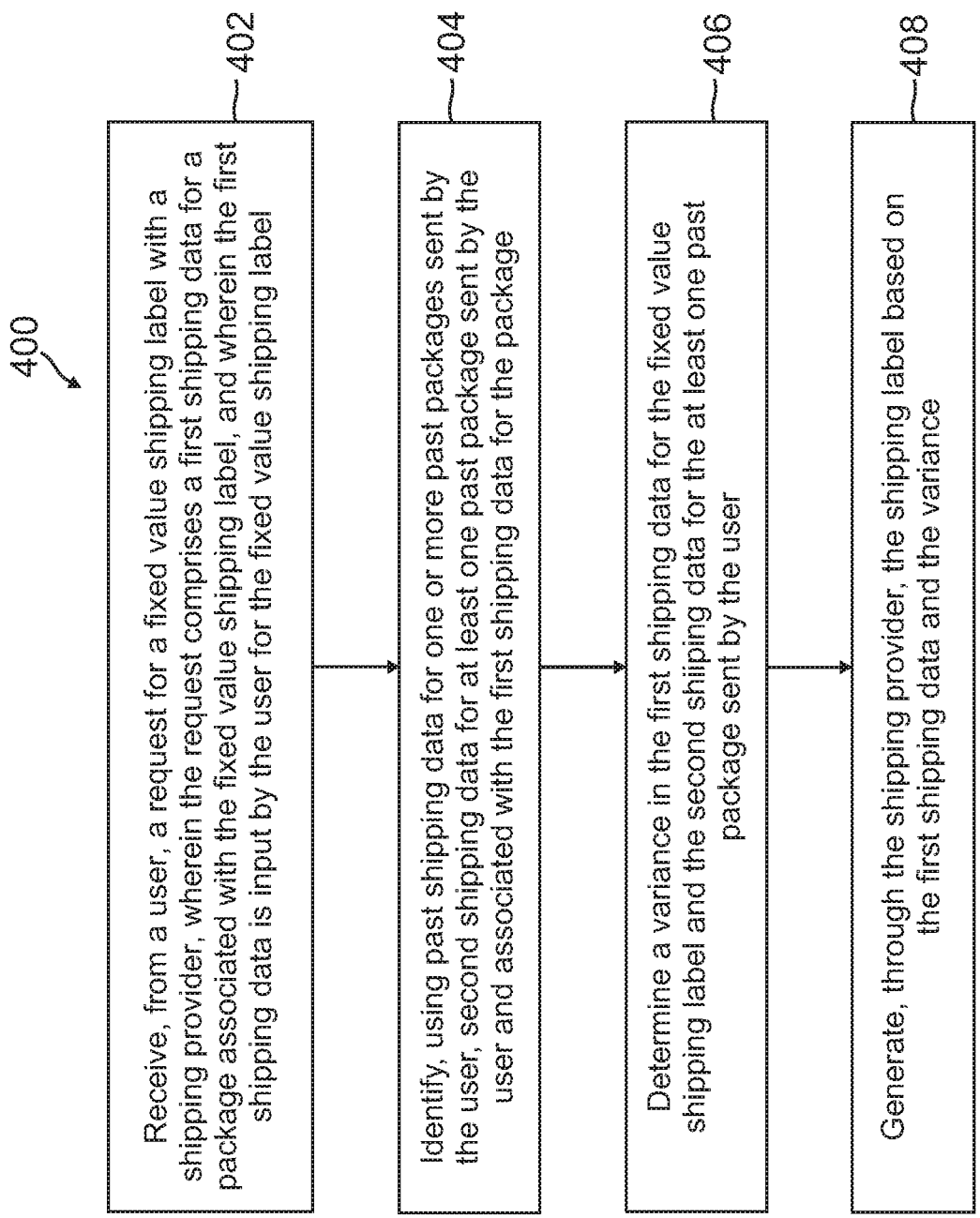
FIG. 4 is an exemplary process flowchart for intelligent adjustment of shipping data based on past cubing tendencies, according to an embodiment.

FIG. 4 is an exemplary process flowchart 400 for telecommunication transaction processing and fraud analysis, according to an embodiment. Note that one or more steps, processes, and methods described herein may be omitted, performed in a different sequence, or combined as desired or appropriate.

At step 402, a request for a fixed value shipping label is received from a user, the request for the fixed value shipping label for the user with a shipping provider, wherein the request comprises a first shipping data for a package associated with the fixed value shipping label, and wherein the first shipping data is input by the user for the fixed value shipping label.

Using past shipping data for one or more past packages sent by the user, second shipping data for at least one past package sent by the user is identified and associated with the first shipping data for the package, at step 404. The past shipping may be specific to the shipping provider, wherein the past shipping data comprises one or more of past package dimension, past label costs, overcharges for past label costs, undercharges for past label costs, and paid penalties for the undercharges for past label costs A variance in the first shipping data for the fixed value shipping label and the second shipping data for the at least one past package sent by the user is determined, at step 406. Determining the variance may comprise accessing a predictive model for the user based on the past shipping data, wherein the predictive model comprises trending data for a cost of shipping the at least one past package. Thus, the variance may be determined by determining, using the predictive model, whether a first value set for the user in the first shipping data differs from a second value in the second shipping data. Determining the variance may further use current shipping costs for the shipping provider.

At step 408, the fixed value shipping label is generated through the shipping provider based on the first shipping data and the variance. In various embodiments, a scanned event indicating that the user utilized the fixed value shipping label to ship the package is received, wherein the scanned event comprises a first amount paid to the shipping provider to ship the package using the fixed value shipping label. The past shipping data may be updated with the first amount. The scanned event may comprise scanned physical dimensions of the package when scanned at a shipping location for the shipping provider, wherein the past shipping data is further updates with the scanned package dimensions. The scanned data may include current shipping data that comprises one of an actual cost required to ship the package or detected physical properties of the package. Thus, an underpayment or an overpayment may be determined, and in response to determining the underpayment in the second amount, a first payment to the shipping provider for the underpayment may be provided. A second payment may be requested from the user for reimbursement of the first payment, and in response to not receiving the second payment, a penalty with an account of the user may be processed. In other embodiments, in response to determining the overpayment in the second amount, an account of the user may be credited with a refund for the overpayment.

The first shipping data may comprise a first amount for the fixed value shipping label selected by the user during input of the first shipping data. Thus, determining the variance may comprise determining a cost difference between a first amount in the first shipping data and a second amount in the second shipping data for at least one paid cost for shipping the at least one past package, wherein the generating the shipping label includes adjusting a payment to the shipping provider for the first amount in the first shipping data based on the cost difference.

The request may be for a plurality of fixed value shipping labels including the fixed value shipping label, wherein operations associated with the request may include generating, through the shipping provider, the plurality of fixed value shipping labels based on the first shipping data and the variance. In various embodiments, a digital representation of the plurality of fixed value shipping labels may be generated, and the digital representation of the plurality of fixed value shipping labels may be transmitted to the user. The digital representation may be used to generate physical shipping labels, such as a printable version of the shipping label that may be printed by the user or at a shipping location. The digital representation may also correspond to a displayable code for a user device that may be scanned by another device (e.g., at a shipping location) to enter in data for the shipping label and/or transmitted to the other device. In further embodiments, data for the shipping label may be communicated to at least one shipping location for the shipping provider with an identifier for the user, wherein the identifier is used by the user to retrieve and use the shipping label to ship the package.

A system executing the steps of flowchart 400 may be provided by a service provider associated with an account of the user, wherein the account is used to generate the fixed value shipping label with the shipping provider over remote connection to a networked device for the shipping provider. In other embodiments, the steps may be provided by a software development kit for one or more applications executed by a device of the shipping provider, wherein the software development kit comprises one or more application processes for the one or more applications, and wherein the one or more application processes implement the operations within the one or more applications.

Figure 5:
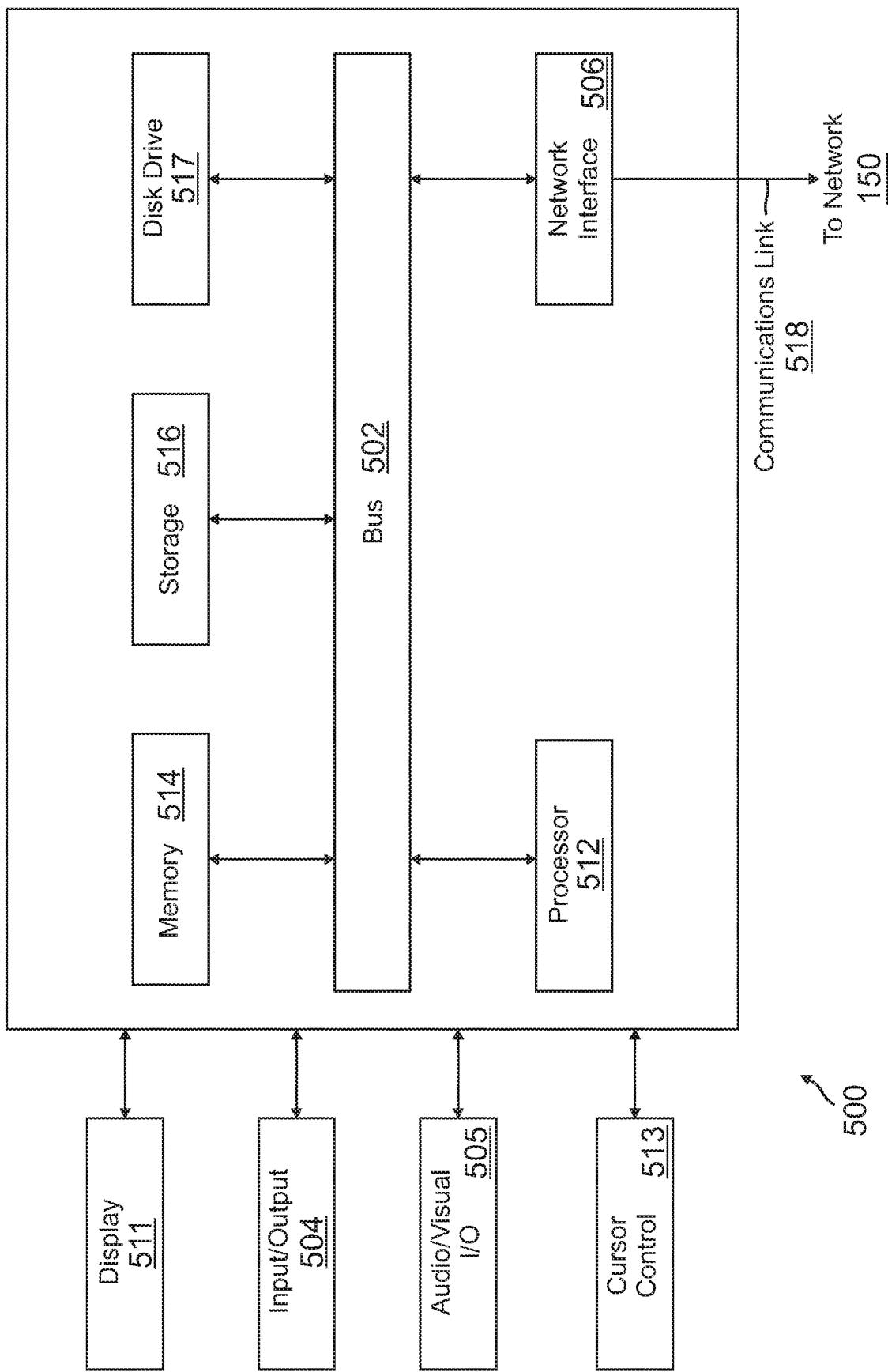
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processors coupled to the non-transitory memory and configured to read instructions from the non-transitory memory to cause the system to perform operations comprising:
        receiving, from a user, a request for a fixed value shipping label, wherein the request comprises first shipping data for a package associated with the fixed value shipping label, and wherein the first shipping data is input by the user for the fixed value shipping label;
        identifying, using past shipping data for one or more past packages sent by the user, second shipping data for at least one past package sent by the user and associated with the first shipping data for the package;
        determining a variance in the first shipping data for the fixed value shipping label and the second shipping data for the at least one past package sent by the user;
        generating, independent of a shipping label system of a shipping provider, the fixed value shipping label based on the first shipping data and the variance;
        encoding, independent of the shipping label system, data to a scannable code associated with the fixed value shipping label, wherein the data provides a shipping payment to the shipping provider based on the first shipping data and the variance;
        interfacing, via at least one application programming interface (API) call, with the shipping label system of the shipping provider;
        activating, via the interfacing, the fixed value shipping label with the shipping label system;
        scanning, by a package scanner of the shipping label system via the interfacing, the scannable code from the fixed value shipping label, wherein the scanning is performed via the interfacing by the system with the shipping label system using at least one process provided by the system to the shipping label system;
        measuring, by the package scanner based on the scanning, package dimensions for the package;
        determining actual shipping data for the package with the shipping provider based on the measuring;
        determining an overpayment or an underpayment based on the actual shipping data; and
        adjusting an additional fixed value shipping label based on the overpayment or the underpayment prior to a use of the additional fixed value shipping label.

2. The system of claim 1, wherein the past shipping data is specific to the shipping provider, and wherein the past shipping data comprises one or more of past package dimension, past label costs, overcharges for past label costs, undercharges for past label costs, or paid penalties for the undercharges for past label costs.

3. The system of claim 1, wherein the actual shipping data comprises a first amount paid to the shipping provider to ship the package using the fixed value shipping label, and wherein the operations further comprise:
    updating the past shipping data with the first amount.

4. The system of claim 1, wherein the operations further comprise:
    updating the past shipping data with the package dimensions.

5. The system of claim 1, wherein the first shipping data comprises a first amount for the fixed value shipping label selected by the user during input of the first shipping data.

6. The system of claim 5, wherein determining the variance comprises determining a cost difference between the first amount and a second amount in the second shipping data for at least one paid cost for shipping the at least one past package, and wherein the generating the fixed value shipping label includes adjusting the shipping payment made for the fixed value shipping label based on the cost difference.

7. The system of claim 1, wherein the system is provided by a service provider associated with an account of the user, and wherein the account is used to generate the fixed value shipping label with the shipping provider over a remote connection to a networked device for the shipping provider.

8. The system of claim 1, wherein the determining the variance further comprises:
    accessing a predictive model for the user based on the past shipping data, wherein the predictive model comprises trending data for a cost of shipping the at least one past package; and
    determining, using the predictive model, whether a first value set for the user in the first shipping data differs from a second value in the second shipping data.

9. The system of claim 1, wherein the operations further comprise:
    generating a plurality of fixed value shipping labels based at least on the variance.

10. The system of claim 9, wherein the operations further comprise:
    generating a plurality of digital representations of the plurality of fixed value shipping labels; and
    transmitting the plurality of digital representations of the plurality of fixed value shipping labels electronically to the user.

11. The system of claim 1, wherein the determining the variance comprises determining a value difference between a first value requested for the fixed value shipping label in the first shipping data for the request and a second value for the at least one past package in the second shipping data, and wherein the determining the variance further uses current shipping costs for the shipping provider.

12. A method comprising:
receiving, by a service provider from a user, shipping information for a shipping label for sending a package using a shipping provider, wherein the shipping information comprises a shipping label parameter for generation of the shipping label, and wherein the shipping information comprises at least a first amount for the shipping label to ship the package using the shipping label;
accessing historical shipping information for at least the user, wherein the historical shipping information comprises past value requirements for past shipping labels used by the user;
determining a second amount for the shipping label based on historical shipping information for the user, wherein the second amount is different from the first amount based on the past value requirements;
automatically generating, independent of a shipping label system of the shipping provider, the shipping label based on the second amount;
encoding, independent of the shipping label system, data to a scannable code associated with the shipping label, wherein the data provides the second amount to the shipping provider;
interfacing, via at least one application programming interface (API) call, with the shipping label system of the shipping provider;
activating, via the interfacing, the shipping label with the shipping label system;
scanning, by a package scanner of the shipping label system via the interfacing, the scannable code from the shipping label, wherein the scanning is performed via the interfacing with the shipping label system using at least one process provided to the shipping label system;
measuring, by the package scanner based on the scanning, package dimensions for the package;
determining current shipping data for the package with the shipping provider based on the measuring, wherein the current shipping data comprises an actual cost required to ship the package based on the current shipping data; and
adjusting an additional shipping label based on the second amount and the current shipping data prior to a use of the additional shipping label.

13. The method of claim 12, further comprising:
determining a value difference for shipping the package using the current shipping data and the second amount for the shipping label, wherein the value difference comprises one of an overpayment or an underpayment in the second amount of the shipping label when shipping the package,
wherein the adjusting is further based on the value difference.

14. The method of claim 13, wherein the current shipping data comprises one of the actual cost required to ship the package or detected physical properties of the package from the package dimensions.

15. The method of claim 13, further comprising:
in response to determining the underpayment in the second amount, providing a first payment to the shipping provider for the underpayment; and
requesting a second payment from the user for reimbursement of the first payment.

16. The method of claim 15, further comprising:
in response to not receiving the second payment, processing an account penalty on an account of the user.

17. The method of claim 13, further comprising:
in response to determining the overpayment in the second amount, crediting an account of the user with a refund for the overpayment.

18. The method of claim 12, further comprising:
communicating data for the shipping label to at least one shipping location for the shipping provider with an identifier for the user, wherein the identifier is used by the user to retrieve and use the shipping label to ship the package.

19. A non-transitory machine-readable medium having stored thereon machine-readable instructions executable to cause a machine to perform operations comprising:
receiving, by a service provider from a user, a request to generate a shipping label for a shipping provider, wherein the request comprises a first amount for the shipping label, and wherein the first amount provides payment for shipping a package with the shipping label;
determining, using historical shipping information for past shipped packages shipped by the user with the shipping provider, a similar past package shipped by the user that is associated with shipping the package using the first amount;
determining a second amount used to ship the similar past package using historical shipping information for the user;
generating, independent of a shipping label system of the shipping provider, the shipping label with the second amount;
encoding, independent of the shipping label system, data to a scannable code associated with the shipping label, wherein the data provides the second amount to the shipping provider;
interfacing, via at least one application programming interface (API) call, with the shipping label system of the shipping provider;
activating, via the interfacing, the shipping label with the shipping label system;
scanning, by a package scanner of the shipping label system via the interfacing, the scannable code from the shipping label, wherein the scanning is performed via the interfacing with the shipping label system using at least one process provided to the shipping label system;
measuring, by the package scanner based on the scanning, package dimensions for the package;
determining current shipping data for the package with the shipping provider based on the measuring, wherein the current shipping data comprises an actual cost required to ship the package based on the current shipping data; and
adjusting an additional shipping label based on the second amount and the current shipping data prior to a use of the additional shipping label.

20. The non-transitory machine-readable medium of claim 19, wherein the non-transitory machine-readable medium comprises a software development kit for one or more applications executed by a device of the shipping provider, wherein the software development kit comprises one or more application processes for the one or more applications, and wherein the one or more application processes implement the operations within the one or more applications.

* * * * *